(12) United States Patent
Kelly et al.

(10) Patent No.: US 6,692,184 B1
(45) Date of Patent: Feb. 17, 2004

(54) RETROFIT DOWEL FOR MAINTAINING CONCRETE STRUCTURES IN ALIGNMENT

(75) Inventors: David L. Kelly, Sacramento, CA (US); Richard W. Schutte, Dumont, NJ (US); Michael Recker, Spring Branch, TX (US)

(73) Assignee: Meadow Burke Products, Sacramento, CA (US)

( * ) Notice: Subject to any disclaimer, the term of this patent is extended or adjusted under 35 U.S.C. 154(b) by 0 days.

(21) Appl. No.: 10/293,099

(22) Filed: Nov. 12, 2002

(51) Int. Cl.$^7$ ................................................ E04F 15/08
(52) U.S. Cl. ......................... 404/52; 404/74; 52/396.02
(58) Field of Search ................................ 404/134, 135, 404/136, 70, 74, 53, 56, 62, 52; 52/677, 679, 682, 684, 685, 686, 396.02

(56) References Cited

U.S. PATENT DOCUMENTS

| | | | | |
|---|---|---|---|---|
| 3,471,987 A | * | 10/1969 | Yelsma | 52/684 |
| 3,694,989 A | * | 10/1972 | Oliver et al. | 52/678 |
| 4,493,584 A | | 1/1985 | Guntert | 404/74 |
| 4,648,739 A | | 3/1987 | Thomsen | 404/2 |
| 4,800,702 A | * | 1/1989 | Wheeler | 52/677 |
| 4,936,704 A | | 6/1990 | Killmeyer | 404/74 |
| 4,953,340 A | * | 9/1990 | Anderson | 52/684 |
| 5,005,331 A | | 4/1991 | Shaw et al. | 52/396 |
| 5,791,816 A | * | 8/1998 | McCallion | 404/136 |
| 5,797,231 A | | 8/1998 | Kramer | 52/396.02 |
| 6,052,964 A | | 4/2000 | Ferm et al. | 52/742.14 |
| 6,092,960 A | * | 7/2000 | McCallion | 404/70 |
| 6,210,070 B1 | | 4/2001 | Shaw et al. | 404/70 |
| 6,212,848 B1 | | 4/2001 | Cooper | 52/684 |
| D444,244 S | * | 6/2001 | McPherson et al. | D25/199 |
| 6,276,108 B1 | * | 8/2001 | Padrun | 52/684 |
| 6,447,203 B1 | * | 9/2002 | Ruiz et al. | 404/70 |
| 2001/0004824 | * | 6/2001 | Hazama | 52/701 |

* cited by examiner

Primary Examiner—Robert E. Pezzuto
Assistant Examiner—Alexandra K. Pechhold
(74) Attorney, Agent, or Firm—Thelen Reid & Priest LLP

(57) ABSTRACT

An apparatus and method of providing a retrofit dowel to maintain adjacent concrete structures in alignment. The dowel is received in a longitudinal groove cut across the structures, and supported in spaced relationship to the bottom of the groove by feet on caps engaged over the ends of the dowel. The feet are positioned so as to be disposed to either side of the dowel. Wings extending laterally of the end caps engage the sides of the groove to center the dowel within the groove and secure it in place. The end caps include structure to secure them from inadvertent displacement from the dowel and stops to provide expansion space to the ends of the dowel, and are translucent to enable the position of a dowel received therein to be visually observed.

23 Claims, 4 Drawing Sheets

RETROFIT DOWEL FOR MAINTAINING CONCRETE STRUCTURES IN ALIGNMENT

The present invention relates to an improved method and apparatus for placing retrofit dowels between adjacent concrete structures, such as pavement slabs. In its more specific aspects, the invention is concerned with an improved combined end cap and chair for supporting a dowel within a groove formed between the structures, which end cap and chair functions both to support the ends of the dowel and to provide a space into which the dowel may expand.

BACKGROUND OF THE INVENTION

When a Department of Transportation, such as Caltrans of California, wants to add additional concrete paving, or to repair damaged concrete pavement, it uses retrofit dowels in the existing pavement. Such dowels are installed by sawing grooves in the pavement and then dropping the dowels into the grooves. The grooves are generally about 24 inches long, 2½ inches wide, 8 inches deep and 12 inches on center. The grooves are cut across adjacent sections of the pavement and ultimately, with the dowels received therein, serve to hold the sections in alignment. The dowels must be positioned parallel to each other and parallel to the top surface of the pavement. They must also be held off the bottom of the groove so that grout can surround them. In addition, they must have a space at each end of the dowel to allow for expansion or contraction.

FIG. 1 shows a typical prior art arrangement where a groove has been sawed between adjacent sections of concrete pavement and a dowel has been placed in the groove. In this arrangement, the dowel is spaced off the bottom of the groove with a rebar chair adjacent each end of the dowel. Plastic caps are provided on the ends of the dowel to create void to either end of dowel. The assembly of the dowel, caps and chairs is manually centered in the groove. Grouting is then filled into the groove and consolidated. If the ends of the dowel are pushed down, while placing the grout or the vibrator used to consolidate the grout, the dowel will fulcrum around one of the chairs and not remain parallel to the top of the pavement.

The prior art also teaches concrete slab dowel systems which are cast in place and employ sleeves received around the dowels which include collapsible spacers at the ends of the dowels to accommodate for relative expansion and contraction of the dowels and concrete. Such an arrangement may be seen, for example, in U.S. Pat. No. 5,797,231.

SUMMARY OF THE INVENTION

The apparatus of the present invention is concerned with a cap for engagement over the end of a dowel to be placed within a retrofit groove formed in and extending across adjacent sections of a concrete structure. The cap has an interior chamber with one end thereof open for receipt of an end portion of the dowel and the opposite end thereof closed. Retaining means is provided to secure the cap against inadvertent displacement from the dowel and positioning means on the interior of the cap establishes spaced relationship between the end of the dowel and the closed end of the cap to provide a space into which the dowel may expand. The positioning means is displaceable to enable the spaced relationship to be reduced in response to excessive relative forces being applied to the cap and the dowel. A foot is provided on the cap to support a dowel received within the cap in spaced relationship to the bottom of the groove.

The invention is also concerned with an assembly comprising a dowel having such end caps engaged over its ends to provide for support of the dowel at its end portions in a condition generally parallel to the bottom of a groove within which the dowel is received. The method of the invention includes the steps of forming the groove across the sections of the concrete structure to be doweled together and positioning the dowel and end cap combination within the groove so that it is supported in spaced relationship to the bottom of the groove by the feet on the end caps. After placement of the dowel, the groove is filled with grout and the grout is compacted.

The invention is also concerned with the provision of wings on the end cap positioned to engage the sides of a groove within which the cap is received to maintain the cap in secure centered relationship relative to the groove. Ideally, the cap is constructed so as to enable the position of the end of a dowel received therein to be visually observed. This may be provided, for example, by fabricating the cap of a translucent material.

A principal object of the invention is to provide for the support of a dowel in a groove extending between adjacent concrete structures in a manner which prevents the dowel from lifting at its ends when grout is back-filled into the groove and compacted.

Another and more specific object of the invention is to provide for such support through means of end caps which have widely spaced feet which may be set over protruding aggregate in the groove.

Still another object of the invention is to provide end caps which accommodate for relative expansion and contraction of the concrete and dowel and are provided with wings which engage opposite slides of the groove to center the dowel within the groove and hold it into place.

Still another general object of the invention is to provide a one piece cap and chair combination which serves to both support the dowel in spaced relationship to the bottom of the groove and to provide for relative expansion and contraction of the dowel and concrete structure.

BRIEF DESCRIPTION OF THE DRAWINGS

The foregoing and other objects will become more apparent when viewed in light of the following detailed description and accompanying drawings, wherein.

THE PRIOR ART ARRANGEMENT

Figure 1:
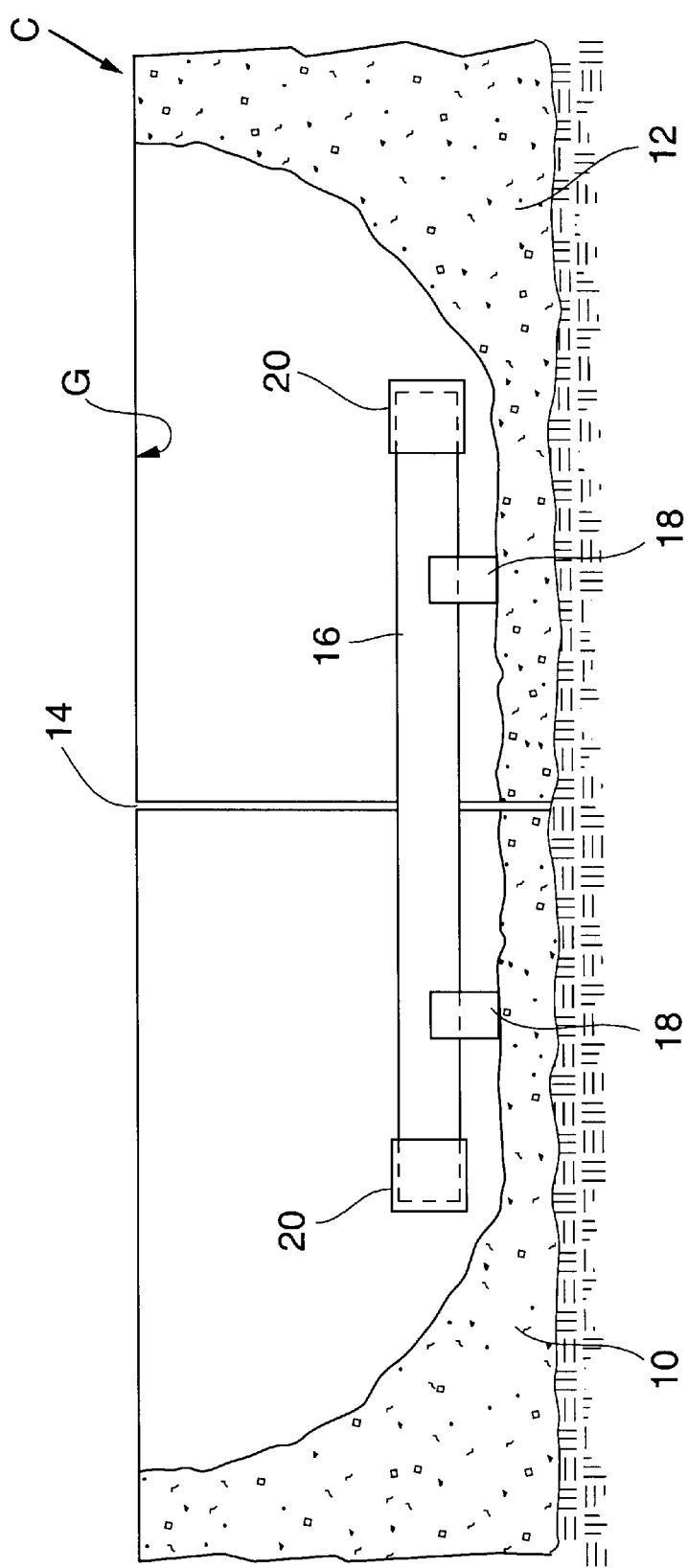
FIG. 1 is a cross-sectional elevational view through adjacent sections of a concrete structure, showing the positioning of a prior art retrofit dowel in a groove cut across the sections.

Referring to FIG. 1, a concrete structure C is shown therein as having adjacent sections 10, 12 with a retrofit groove G extending thereacross. The sections 10 and 12 are separated by a separation line 14. The line 14 may be preformed or the result of cracking. Although the concrete structure shown in FIG. 1 is pavement, it could be another type of concrete structure.

The dowel shown in FIG. 1 is designated by numeral 16 and is shown as being supported on spaced chairs 18, and as having end caps 20. The chairs are spaced inwardly from the ends of the dowel and function, ideally, to support the dowel and spaced generally parallel relationship to the bottom of the groove G. The end caps are formed so as to provide space at the ends of the dowel to accommodate relative expansion and contraction of the concrete structure and the dowel.

In assembly, the chairs 18 are placed in the groove and then the dowel 16, with the caps 20 in place, is centered on the chairs, as may be seen in FIG. 1. Then the groove G is grouted and the grout is compacted. During the course of grouting and compaction, there is a risk that the dowel will move, both as the result of the chairs being relatively free to move and as the result of compaction of the grout functioning to fulcrum the dowel about either of the chairs.

DETAILED DESCRIPTION OF THE PREFERRED EMBODIMENT

Figure 2:
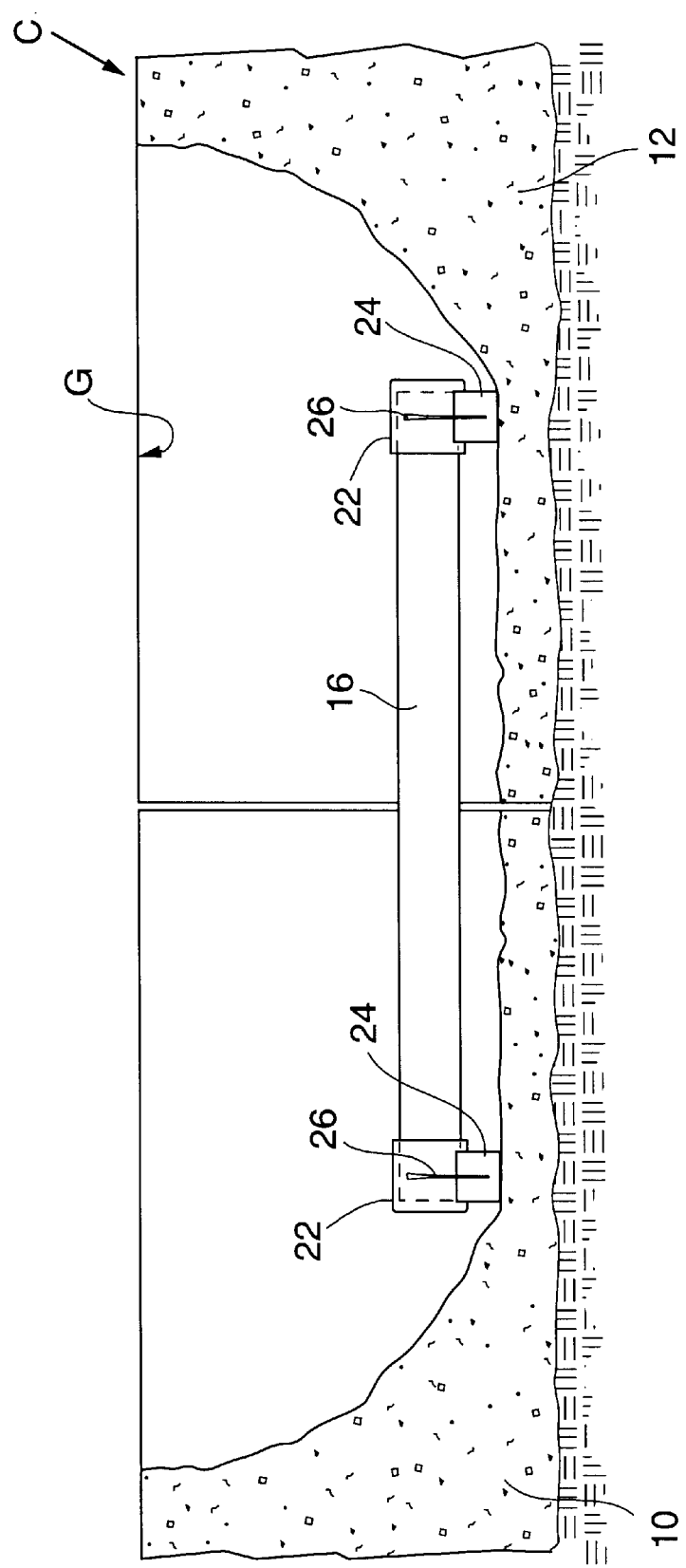
FIG. 2 is a cross-sectional elevational view through adjacent sections of a concrete structure, showing the inventive retrofit dowel and support in a groove cut across the sections.
Figure 3:
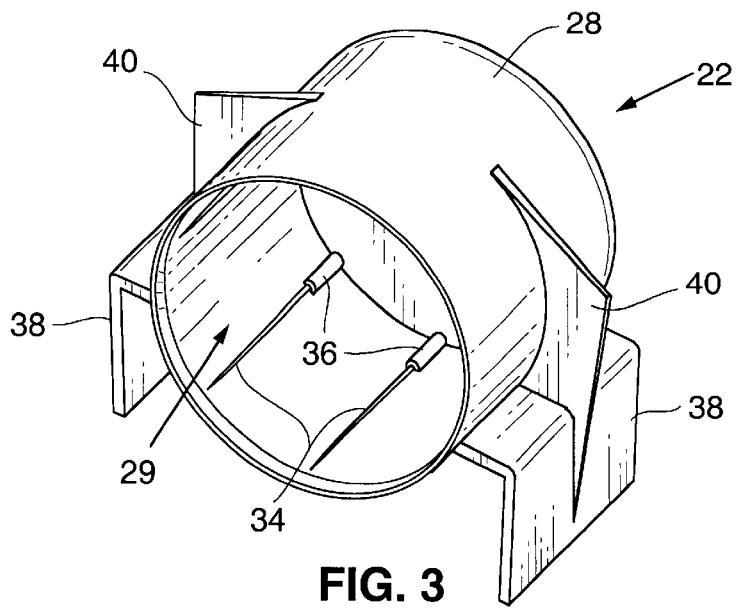
FIG. 3 is a perspective view of the end cap of the present invention.
Figure 4:
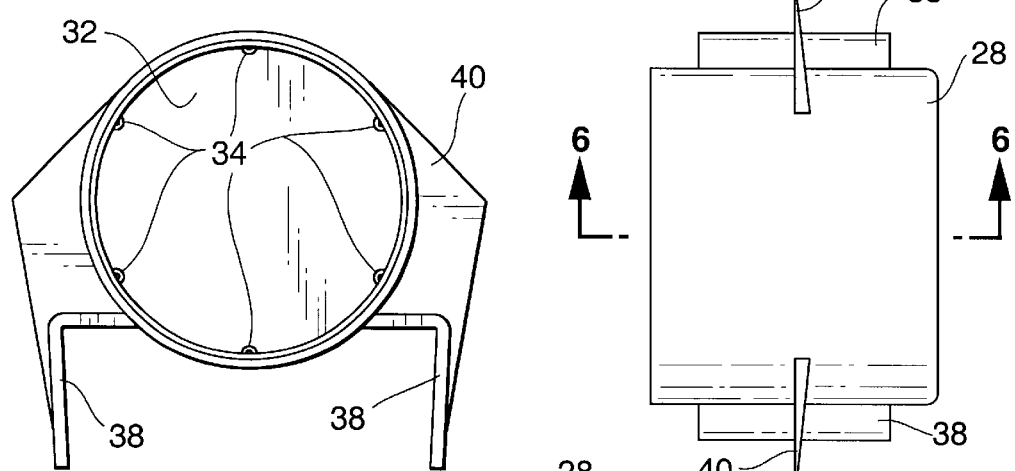
FIGS. 4 and 5 are front elevational and top plan views, respectively, of the inventive end cap.
Figure 5:
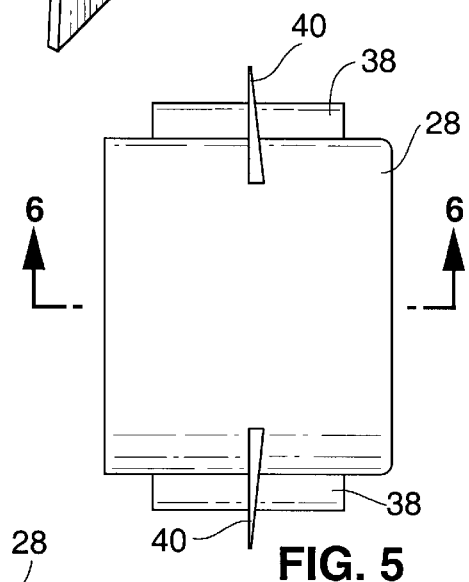
Figure 6:
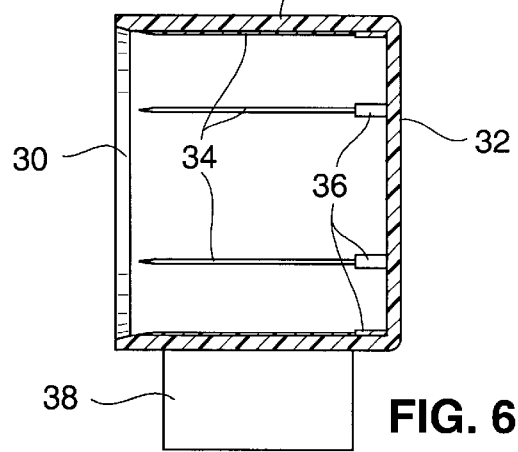
FIG. 6 is a cross-sectional elevational view taken on the plane designated by line 6—6 of FIG. 5.

The inventive arrangement shown in FIG. 2 is used in a concrete structure C having adjacent sections 10, 12 and a groove G corresponding to what is shown in FIG. 1. It is different, however, in the structure used to support the dowel 16 within the groove. This difference is the result of novel end caps 22 which have integrally formed feet 24 to support the ends of the dowel and wings 26 to frictionally engage opposite sides of the groove G.

The detailed construction of the end caps 22 may best be seen from FIGS. 3 to 6. The caps are fabricated of generally translucent polypropylene. They each comprise a generally cylindrical section 28 defining therein a chamber 29 having an opening 30 at one end for receipt of an end portion of the dowel and an end wall 32 at the other end thereof. In a typical embodiment, the diameter of the interior of the chamber is 1⅝ inches and the length of the cylindrical section is 1½ inches. The typical outside diameter for the cylindrical section is 1.8 inches. The interior of the chamber has integrally formed tapered protrusions 34 which extend longitudinally from the opening 30 towards the closed end 32 and increase in thickness towards the closed end. The protrusions 34 terminate at stop elements 36 formed integrally with the caps 22. Externally, the cap 28 is formed with transversely spaced feet or leg portions 38 and webs 40. Ideally, the opening 30 has an inwardly tapered edge to facilitate insertion of a dowel into the chamber of the cap.

Figure 7:
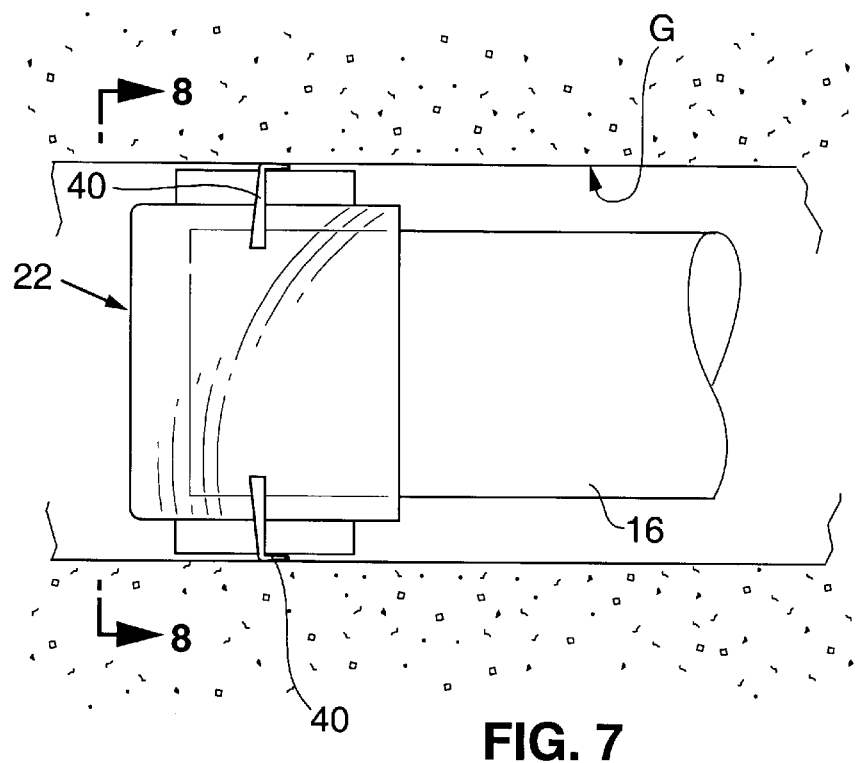
FIG. 7 is a plan view of the end cap and dowel combination of the present invention received within a groove formed in a concrete structure, showing the wings of the cap engaged with and deflected by the oppositely disposed walls of the groove.
Figure 8:
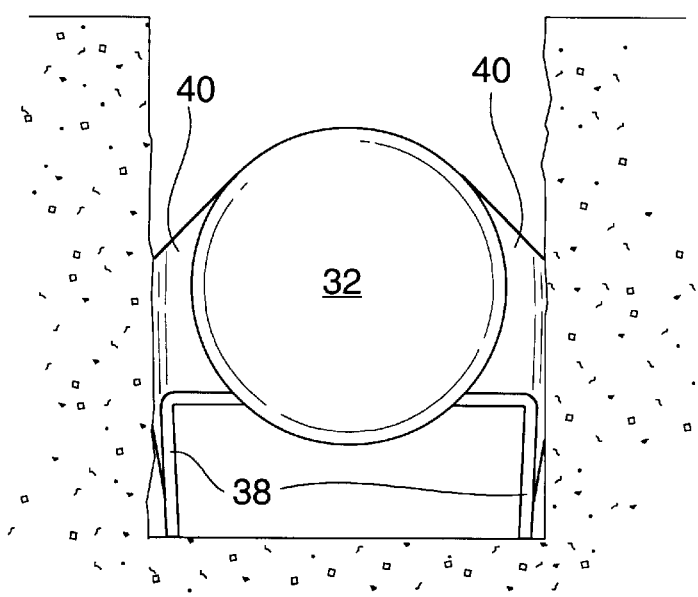
FIG. 8 is a cross-sectional elevational view taken on the plane designated by line 8—8 of FIG. 7.

FIGS. 7 and 8 show the end cap in use in placing a dowel 16 within the groove G. As there shown, the dowel is extended through the opening 30 of the cap and into engagement with the stop elements 36. As the dowel is so placed, it engages the tapered protrusions 34 which serve to frictionally retain the cap in engagement with the end portion of the dowel. The stops 36 abut the end of the dowel and serve as positioning means to establish a spaced relationship between the end of the dowel and the closed end 32 of the cap. After the caps are securely placed on opposite ends of the dowel, the dowel is centered relative to the groove and forced into place, as seen FIGS. 7 and 8. During the course of such placement, the webs 40 frictionally engage the sides of the groove and are resiliently deflected, thus serving to center and secure the end caps and dowel carried thereby centrally of the groove. From FIG. 8 it will be seen that the leg portions 38 engage with the bottom of the groove G and support the dowel 16 and spaced generally parallel relationship to the bottom of groove. There it will also be seen that the legs 38 are transversely spaced relative to the dowel by a distance greater than the diameter of the dowel. The wings 40 are formed integrally with and merge with the cylindrical section 28 and the leg portions 38, thus serving to reinforce the leg portions. The stops 36 are so proportioned as to engage the edges of the dowel 16 and hold the end of the dowel in spaced relationship to the end 32 of the cap. They are deformable, however, to permit the dowel to move toward the end 32 in response to the excessive forces which may result from relative expansion and contraction of the dowel and concrete structure.

From the foregoing description is it believed apparent that the present invention enables the attainment of the objects initially set forth herein. In particular, it provides an integral end cap and chair construction to securely support a retrofit dowel within a groove, while avoiding tilting of the dowel as the result of grouting and compaction and providing expansion space to the ends of the dowel. It should be understood, however, that the invention is not intended to be limited to the specifics of the embodiment herein illustrated and described, but rather is defined by the accompanying claims.

We claim:

1. An apparatus for supporting a dowel within a groove formed in and extending across adjacent sections of a preexisting concrete structure, said apparatus comprising:

a. a cap for engagement over an end of the dowel, said cap having an interior chamber with one thereof open for receipt of an end portion of the dowel and an opposite end thereof closed;

b. retaining means on the cap for engagement with an end portion of a dowel received within the cap to secure the dowel against inadvertent displacement from the cap;

c. positioning means on the interior of the cap to establish spaced relationship between the end of a dowel received within the cap and the closed end of the interior, said positioning means being displaceable to enable said spaced relationship to be reduced in response to excessive relative forces being applied to the cap and a dowel; and d. at least one foot on the cap to support the cap in spaced relationship to a bottom surface of the groove of a concrete structure within which the cap is received.

2. An apparatus according to claim 1 wherein the retaining means comprises at least one protuberance to the interior of the chamber disposed for frictional engagement with the end portion of a dowel received within the cap.

3. An apparatus according to claim 2 wherein the protuberance comprises a rib extending generally from the open end towards the closed end.

4. An apparatus according to claim 3 wherein the rib tapers so as to increase in depth from the open end toward the closed end.

5. An apparatus according to claim 2 wherein the positioning means comprises a stop element disposed for abutting engagement with the end of a dowel received within the cap.

6. An apparatus according to claim 1 wherein the cap further comprises wings disposed for frictional engagement with generally opposite sides of the groove of a concrete structure within which the cap is received to maintain the cap and a dowel received therein in secure generally centrally disposed relationship to the groove.

7. An apparatus according to claim 1 wherein the foot comprises a pair of elements spaced transversely of the cap for engagement with the bottom surface of a groove within which the cap is received, said elements being disposed, respectively, so as to be to either side of a dowel received within the cap.

8. An apparatus according to claim 1 further comprising means to enable the position of the end of a dowel received in the cap to be visually observed.

9. An apparatus according to claim 8 wherein the means to enable the end of a dowel to be observed is provided by a translucent portion of the cap.

10. An apparatus for engagement within a groove formed in and extending across adjacent sections of a preexisting concrete structure to maintain said sections in alignment, said apparatus comprising:
 a. an elongate dowel proportioned for receipt within the groove in a condition wherein end portions of the dowel extend, respectively, into the adjacent sections and terminate in ends within the sections;
 b. a cap engaged over each end portion of the dowel, each said cap having an interior chamber with an open end through which the dowel extends and a closed end disposed in apposition to the end of the dowel received therein;
 c. retaining means on each cap engaged with the dowel to secure the dowel against inadvertent displacement from the cap;
 d. positioning means on the interior of each cap to establish spaced relationship between the end of the dowel received within the cap and the closed end of the interior chamber of the cap, said positioning means being displaceable to enable said spaced relationship to be reduced in response to excessive relative forces being applied to the cap and the dowel; and,
 e. at least one foot on each cap to support the cap in spaced relationship to a bottom surface of the groove.

11. An apparatus according to claim 10 wherein the retaining means comprise at least one protuberance to the interior of the chamber of each cap disposed in frictional engagement with the end portion of the dowel received within the cap.

12. An apparatus according to claim 11 wherein the protuberance for each cap comprises a rib extending generally from the open end towards the closed end of the cap.

13. An apparatus according to claim 12 wherein the rib for each cap tapers so as to increase in depth from the open end toward the closed end of the cap.

14. An apparatus according to claim 10 wherein the positioning means for each cap comprises a stop element disposed in abutting engagement with the end of the dowel received within the cap.

15. An apparatus according to claim 10 wherein each cap further comprises wings disposed for frictional engagement with generally opposite sides of the groove to maintain the cap and dowel in secure generally centrally disposed relationship to the groove.

16. An apparatus according to claim 10 further comprising means to enable the position of the end of a dowel received in the caps to be visually observed.

17. An apparatus according to claim 16 wherein the means to enable the end of a dowel to be observed is provided by translucent portions of the caps.

18. An apparatus according to claim 10 wherein the foot on each cap comprises a pair of elements spaced transversely of the cap for engagement with the bottom surface of a groove within which the cap is received, said elements being disposed, respectively, so as to be to either side of the dowel.

19. A method of retrofitting adjacent sections of a preexisting concrete structure to maintain said sections in alignment, said method comprising:
 a. forming an elongate groove across the sections;
 b. providing an elongate dowel proportioned for receipt within the groove in a condition wherein end portions of the dowel extend, respectively, into the adjacent sections and terminate in ends within the sections;
 c. providing caps proportioned for engagement over the end portions of the dowel, each said cap having:
  i. an interior chamber with an open end through which the dowel may be extended and a closed end disposed to be in apposition to the end of the dowel received therein;
  ii. positioning structure in the interior of the chamber to establish spaced relationship between the end of a dowel received within the cap and the closed end of the chamber, said positioning structure being displaceable to enable said spaced relationship to be reduced in response to excessive relative forces being applied to the cap and the dowel; and,
  iii. at least one foot to support the cap in spaced relationship to a bottom surface of the groove;
 d. engaging said caps over the end portions of the dowel; and,
 e. positioning said dowel in the groove with the feet of the caps engaged with the bottom surface of the groove.

20. The method of claim 19 further comprising providing a protuberance on the interior of the chamber of each cap for frictional engagement with the end portion of a dowel received within the cap to secure the cap against inadvertent displacement from the dowel.

21. The method of claim 19 wherein the positioning structure provided for each cap comprises a stop element disposed for abutting engagement with the end of a dowel received within the cap.

22. The method of claim 19 further comprising providing wings on each cap for frictional engagement with generally opposite sides of the groove to maintain the cap and dowel in secure generally centrally disposed relationship to the groove.

23. The method of claim 19 wherein the foot provided on each cap comprises a pair of elements spaced transversely of the cap for engagement with the bottom surface of a groove within which the cap is received, said elements being disposed, respectively, so as to be to either side of a dowel received in the cap.

* * * * *